No. 735,992. PATENTED AUG. 11, 1903.
J. H. MARTIN.
LOCK NUT.
APPLICATION FILED SEPT. 6, 1902.
NO MODEL.
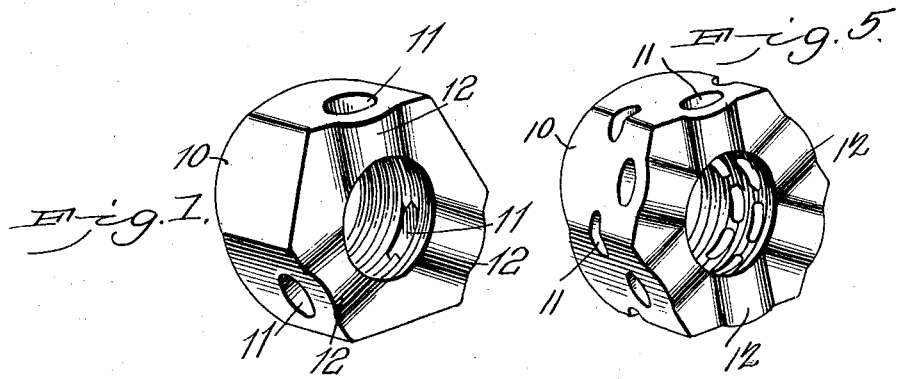
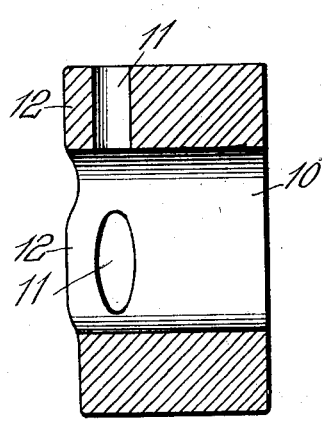
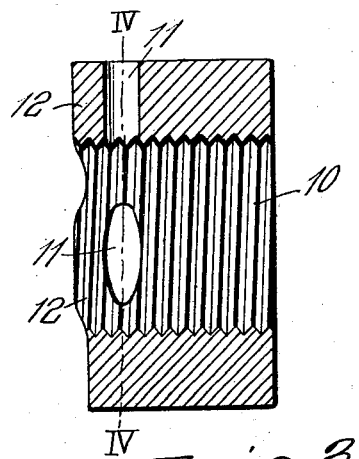
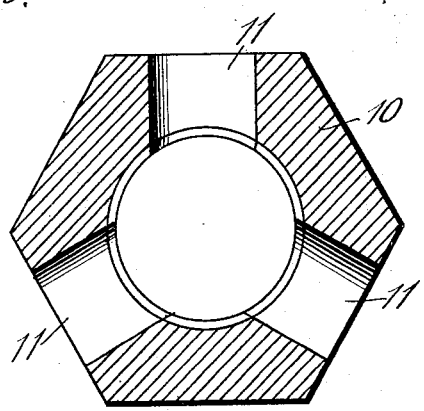
Witnesses
E. J. Stewart
C. N. Woodward
J. H. Martin, Inventor.
by C. A. Snow & Co.
Attorneys No. 735,992.

Patented August 11, 1903.

UNITED STATES PATENT OFFICE.

JOHN HENRY MARTIN, OF MEADVILLE, PENNSYLVANIA, ASSIGNOR OF ONE-HALF TO CHARLES MUENZENBERGER, OF MEADVILLE, PENNSYLVANIA.

LOCK-NUT.

SPECIFICATION forming part of Letters Patent No. 735,992, dated August 11, 1903.

Application filed September 6, 1902. Serial No. 122,388. (No model.)

*To all whom it may concern:*

Be it known that I, JOHN HENRY MARTIN, a citizen of the United States, residing at Meadville, in the county of Crawford and State of Pennsylvania, have invented a new and useful Lock-Nut, of which the following is a specification.

This invention relates to lock-nuts, and has for its object the production of a nut containing within itself and forming a part thereof the means for preventing its reverse rotation; and the invention consists in a nut having yieldable protuberances extending from the inner face and containing portions of the threads and adapted to forcibly embrace the threads of the bolt when the nut is set up in place and thereby effectually lock the nut to the bolt and prevent reverse rotation.

In the drawings illustrative of the invention, Figure 1 is a perspective view of a nut having the improvements embodied therein. Fig. 2 is a sectional view of a blank nut before the threads are formed therein, and Fig. 3 is a similar view of the completed nut. Fig. 4 is a transverse sectional view on the line IV IV of Fig. 3. Fig. 5 is a view similar to Fig. 1, illustrating a modification in the construction.

In this invention is comprised a nut having one or more yieldable protuberances extending from the inner face of the nut, the protuberances being formed prior to the cutting of the threads, so that when the threads are cut in the interior of the nut they will also be formed in the inner faces of the protuberances, so that when the nut is screwed home upon its seat the protuberances will be compressed and the threads therein likewise compressed with great force against the threads of the bolt with which they engage, thereby firmly locking the nut upon the bolt and preventing reverse rotation. These protuberances will preferably be formed by forcing a punch or other implement through the side of the nut-blank sufficiently near the inner face to cause the material of the nut to be pressed outward, but the protuberances may be formed in any suitable manner, and I do not wish, therefore, to be limited to any specific means for forming them.

When the improvement is formed on hexagonal nuts, three of the transverse apertures and their accompanying protuberances will generally be employed through each alternate face of the nut, and when square nuts are employed two or four of the apertures and protuberances may be employed, as required but any number may be employed.

For the purpose of illustration the invention is shown applied to an ordinary six-sided or hexagonal nut 10 with three of the transverse apertures (indicated at 11) and the accompanying protuberances or projecting portions 12.

In Fig. 2 a nut-blank is shown in transverse section with the apertures 11 formed therein prior to the cutting of the threads, and in Fig. 3 a similar view is shown after the threads are cut to illustrate the method of forming the improved nut.

It will be noted by reference to Fig. 3 that portions of the thread are formed in the inner faces of the protuberances or projecting portions 12, and then when the nut is forced down upon its seat and the protuberances compressed into the transverse openings and in alinement with the general inner face of the nut by the engagement with the face of the object to be secured it will be obvious that the portions of the thread within the protuberances will be "clenched" against the threads of the bolt and firmly lock the nut in place and prevent reverse rotation.

This makes a very complete, simple, and cheaply-constructed lock-nut which may be applied to any of the various sizes and forms of nuts and may be operated by the same wrench which sets the nut home upon its seat and will not require the exercise of more than a small amount of extra force to cause the "clenching" action of the protuberances.

The amount of material between the apertures and the lower face of the nut will be sufficient to resist any tendency to reverse rotation of the nut, but at the same time will yield to a force applied to the nut, such as a wrench, to force it backward when the nut is to be removed.

After the removal of the nut it may be readily restored by forcing a punch into the apertures and again pressing the material outward to re-form the protuberances and realine the threads therein with the threads in the body of the nut.

Fig. 5 shows a modification of the manner of arranging the apertures, wherein one of the apertures is formed through each of the six sides of the nut and with additional apertures 13 alternating therewith and above them, which arrangement may be employed, if required; but this would not be a departure from the principle of the invention, as the results produced will be precisely the same as in the arrangement shown in the other figures of the drawings.

If desired, the yieldable protuberances or projections might be formed by cutting away portions of the lower surface of the nut.

Having thus described the invention, what is claimed is—

1. As a new article of manufacture, a locknut provided on its inner face with a yieldable protuberance and a cavity wholly inclosed by the body of the nut in proximity to the protuberance to permit said protuberance to be forced into the cavity to lock the nut in position.

2. As a new article of manufacture, a locknut provided with a central threaded opening, a transverse opening wholly inclosed by the body of the nut communicating with the central opening, the inner face of the nut above the transverse opening being extended beyond the plane thereof to form a yieldable protuberance, said protuberance being adapted to be compressed into the transverse opening to lock the nut in position when the same is forcibly seated.

In testimony that I claim the foregoing as my own I have hereto affixed my signature in the presence of two witnesses.

JOHN HENRY MARTIN.

Witnesses:
CHARLES MUENZENBERGER,
SARA M. JOHNSON.